INVENTOR.
Alfred H Bellows

BY

Brown and Mikulka
and
John H. Coult
ATTORNEYS

Sept. 23, 1969        A. H. BELLOWS        3,468,230
PHOTOGRAPHIC CAMERA HAVING A SCANNING EXPOSURE
SYSTEM WITH DISTORTION COMPENSATION
Filed July 21, 1967        7 Sheets-Sheet 3

FIG. 3

INVENTOR.
Alfred H. Bellows
BY Brown and Mikulka
and
John H. Coult
ATTORNEYS

United States Patent Office 3,468,230
Patented Sept. 23, 1969

3,468,230
PHOTOGRAPHIC CAMERA HAVING A SCANNING EXPOSURE SYSTEM WITH DISTORTION COMPENSATION
Alfred H. Bellows, Cambridge, Mass., assignor to Polaroid Corporation, Cambridge, Mass., a corporation of Delaware
Filed July 21, 1967, Ser. No. 655,192
Int. Cl. G03b 37/02
U.S. Cl. 95—15                                10 Claims

ABSTRACT OF THE DISCLOSURE

This disclosure depicts a compact hand-held photographic camera with a scanning exposure system having a folded optical path. Compensation means are disclosed by which the magnification and angular attitude of the focal surface of elemental images formed successively by the exposure system are altered during a scan of the object to produce substantially undistorted images.

Summary of the invention

This invention concerns a compact photographic camera having a scanning exposure system including image-forming means for forming an image of an object to be photographed at a predetermined image area and scanning means cooperating with the image-forming means to effect a continuous angular optical scan of the object such that successively scanned object points are imaged in succession at the image area by the image-forming means, the angular attitude of the focal surface of successively formed image points varying with respect to the image area during a scan of the object to cause compressive distortions of said image points. Compensation means are included which are operative during a scan of the object to reduce the said compressive distortions of the images thus formed. The invention further contemplates means for simultaneously compensating for the described cylindrical perspective distortions, as well as for compressive distortions.

Background of the invention

Traditionally, hand-held photographic cameras designed to accommodate photosensitive materials with relatively large format film have been relatively bulky and cumbersome when in use because of the size of the exposure chamber which is necessary to form a relatively large photographic image with a conventional static rectilinear imaging system. The utilization of bellows is common for enabling cameras to be folded when not in use. However, the necessity of erecting such folding cameras before use and the somewhat large overall dimensions of the erected camera when in use has proven to be an inconvenience. The use of short focal length, wide angle lenses has enabled the use of non-folding cameras with rigid-walled exposure chambers; however, apart from being somewhat bulky, the relatively small scale of the image and the problems attending the use of wide angle objectives renders such cameras unsatisfactory for many photographic applications.

A compact camera has been devised which overcomes the objections set forth above, accommodating a relatively long focal length objective and a correspondingly large format film, and yet offering a permanently erected exposure system in an extremely compact rigid housing. In order to obtain such a compact camera, in one form the exposure light path is folded along two mutually orthogonal axes parallel to the length and depth dimensions of the camera. The camera functions by effecting a continuous angular optical scan of the object to be photographed while simultaneously imaging successively scanned object points through a focal plane exposure slit upon photosensitive materials caused to move behind the slit at a velocity which is coordinated with the rate at which the object is scanned.

A scanning exposure system as described suffers the inherent lens aberrations, namely, the monochromatic (Seidel) aberrations consisting of astigmatism, coma, Petzval curvature (curvature of field), distortion, and spherical aberration in addition to the chromatic aberrations.

However, such a scanning exposure system has a number of additional aberrations. One of these additional aberrations, more aptly termed a distortion, results from the condition that as the field is scanned, the angular relationship between the (fixed) image area and the focal surface of the successively formed elemental images, which collectively constitute an image of the photographed object, varies in a manner related to the instantaneous scan angle. The resulting images exhibit a compressive distortion in a direction corresponding to the direction in which the object is scanned. The correction of these compressive image distortions is an important part of this invention.

Objects of the invention

Accordingly, it is an object of this invention to provide an extremely compact photographic camera having a scanning exposure system and means for reducing the above-described compressive distortion in the images formed by the exposure system. It is yet another object to provide means in a photographic scanning exposure system for simultaneously compensating for the described cylindrical perspective distortion as well as for compressive distortions.

It is another object to provide in a scanning exposure system means for preventing the smearing of the images of off-axis object points as the images are being formed.

It is a further object of this invention to provide a compact photographic camera having a scanning exposure system for optically scanning an object to be photographed and imaging successively scanned object points in succession at a predetermined image area such that a complete image of the object may be recorded upon image-receiving means moved relative to the image area during a scan of the object, the system further including first compensation means coordinated with the scanning means for altering the magnification of elemental images formed successively during a scan of the object to substantially reduce cylindrical perspective distortion in the images formed and second compensation means to substantially reduce compressive distortion in the images formed.

Other objects of the invention will in part be obvious and will in part appear hereinafter.

The invention accordingly comprises the apparatus possessing the construction, combination of elements and arrangement of parts which are exemplified in the following detailed disclosure and the scope of the application of which is indicated in the claims.

For a fuller understanding of the nature and objects of the invention, reference should be had to the following detailed description taken in connection with the accompanying drawings.

Description of the preferred embodiments

Figure 1:
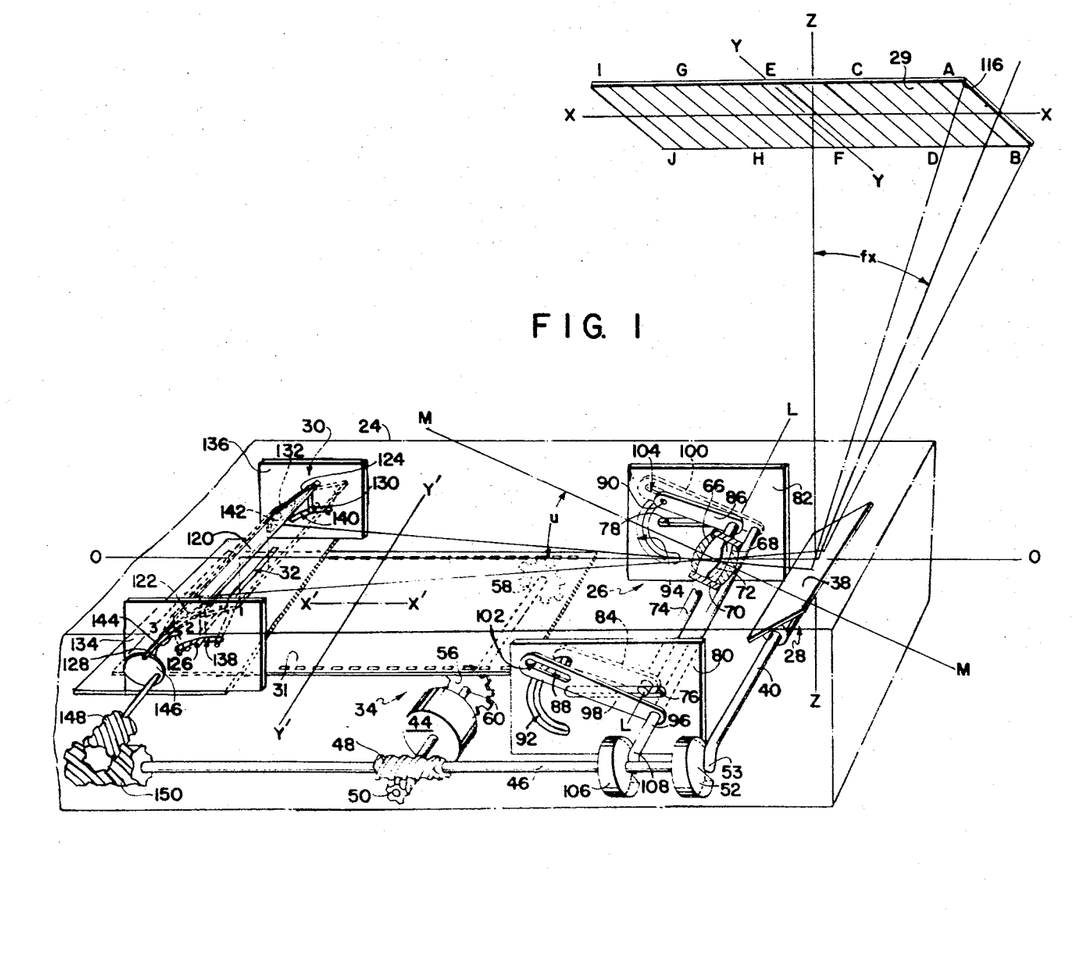
FIGURE 1 is a schematic illustration of a compact photographic camera including a scanning exposure system constructed in accordance with the principles of the invention.

FIGURE 1 schematically depicts a compact photographic camera having a scanning exposure system which includes means embodying the principles of the invention. However, before entering into a discussion of the invention and possible implementations thereof, it is of value to first understand the nature and cause of the above-indicated aberrations existing in a scanning exposure system, as described, which are in addition to the Seidel aberrations. The nature of these additional aberrations which exist in a scanning exposure system of the type described may be best understood by referrring to FIG. 2 which shows schematically (in un-broken lines) a conventional static rectilinear image-forming system 10 for forming an image of an assumed focus plane, herein termed object 12, upon a planar sheet of a photosensitive material 14. The object 12 is shown as having an essentially rectangular grid-like configuration comprising a plurality of pairs of parallel lines defining equally spaced parallel strips 16 on the object 12. It is assumed that the illustrated system is orthoscopic, that is to say that the system is corrected at least for Seidel distortion such that uniform lateral magnification of the image is produced throughout the usable field. It is further assumed that the image-forming means 10 is corrected for Petzval curvature and spaced from the photosensitive material 14 such that the focal field is flat and coincident with the plane of the photosensitive material 14.

Figures 2, 2A:
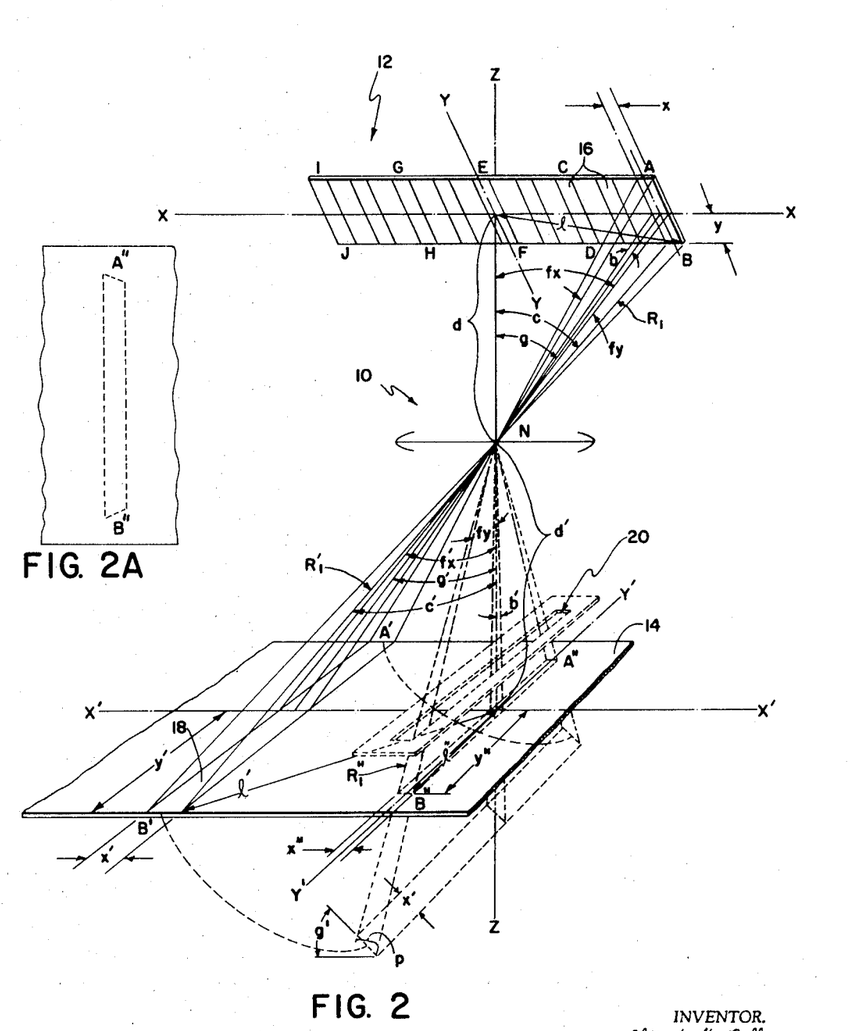
FIG. 2 is a schematic illustration of photographic image-froming systems which is useful in connection with an understanding of the background of the invention.
FIG. 2A is a top plan view of a portion of FIG. 2.

For convenience of explanation and understanding, the ends of certain of the strips 16 on the object 12 have been given lateral designations; the ends of corresponding images 18 of the object strips 16 are also designated literally by corresponding primed letters.

Figure 3:
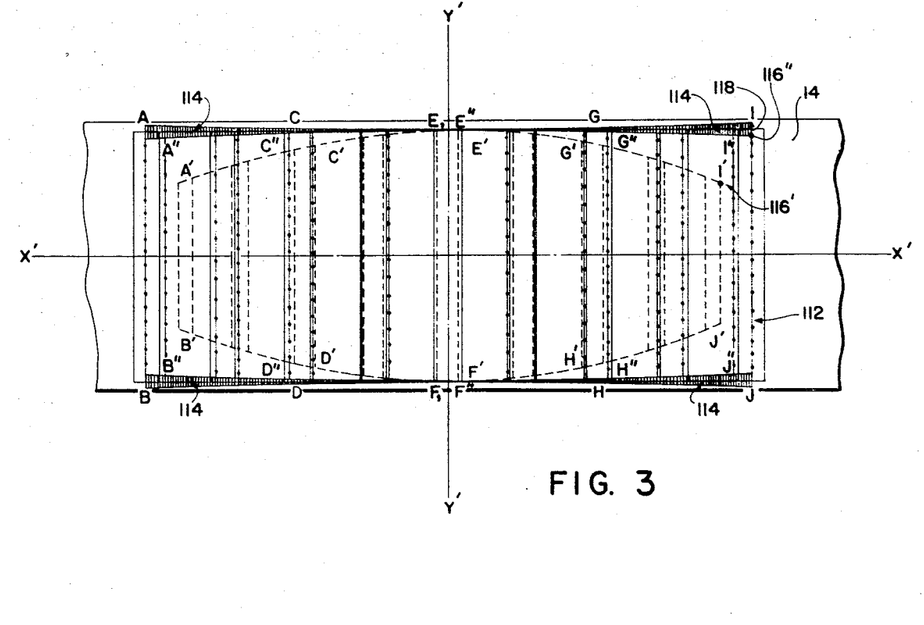
FIG. 3 is a representation of images which might be formed on image-receiving means by image-forming systems described herein.
Figures 4A, 4B, 4C:
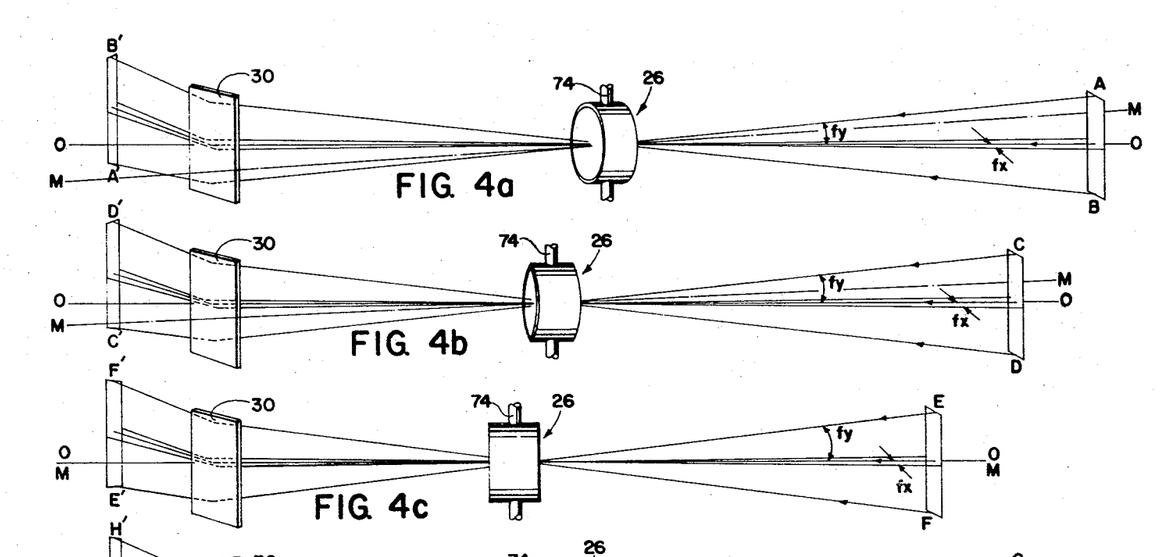
FIGS. 4a–4e represent a series of time sequence diagrams illustrating the operation of structure implimenting the inventive concepts.
Figures 4D, 4E:
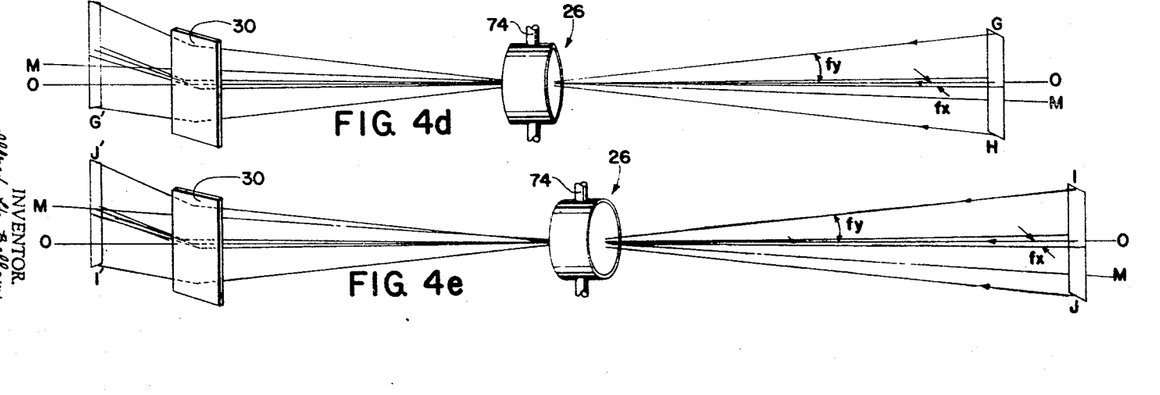

An image of object 12 formed by the described static rectilinear imaging system, assumed to have a flat focal field and produce a (Seidel) distortion-free image, would appear as shown in solid lines in FIG. 3 with all grid lines parallel to the X—X axis in the object 12 appearing parallel to the X'—X' axis in the image (herein termed the image scan axis); likewise, all object lines parallel to the Y—Y axis in the object are imaged parallel to the corresponding Y'—Y' axis in the image. In other words, the image formed by the stytem exhibits uniform lateral magnification throughout the entire field.

A condition of uniform magnification throughout the field demands that, in accordance with Airy's tangent condition of orthoscopy, the tangent of the angle (herein termed the slope angle) which any selected chief object ray makes with axis Z—Z must equal the tangent of the slope angle which the corresponding image ray makes with the same axis. The condition of orthoscopy further requires that the ratio of image distance to object distance be invariant throughout the field. In FIG. 2, the tangent of the slope angle $c$ between object chief ray $R_1$ and the Z—Z axis equals the tangent of the corresponding slope angle $c'$ in image space defined by the image chief ray $R'_1$ and the axis Z—Z. Thus, as seen in FIG. 3, the (solid line) image of the grid-like assumed object 12 that would be formed by the image-forming means 10 is an accurate and undistorted facsimile of the object 12.

The camera with which the subject invention is particularly suited, described briefly above, is rendered capable of exposing a relatively large fromat film with a comparatively long focal length objective in an extremely compact exposure chamber by causing the light path from the scene to the photosensitive material to be folded, and by effecting a scan of the object simultaneously and in close coordination with a transport of the photosensitive material behind a fixed focal plane exposure slit. With such an exposure system the effective field angle along the scan (X—X) axis of the image-forming means 10 at any instant during exposure is a fraction of the field angle defining the total field captured during a total exposure interval.

In terms of the FIG. 2 illustration, to expose the entire object 12 to produce an image as shown in solid lines in FIG. 3 with a static rectilinear system, a half-field angle along the X—X and Y—Y axes, designated $f_x$ and $f_y$, respectively, in the object space and $f'_x$ and $f'_y$, respectively, in the object space and $f'_x$ and $f'_y$ respectively, in the image space, and a correspondingly large exposure chamber would be required. Scanning panoramic cameras of the type which maintain the photosensitive materials in a fixed position during exposure also require a correspondingly large exposure chamber. The camera with which this invention is associated enables the use of an exposure chamber which is compact in comparison. This camera effects an exposure of the entire object 12 by scanning successive strips (parallel to the Y—Y axis) of the object (with means not shown in FIG. 2) and imaging the elemental scanned strips along a fixed axis through an elongated focal plane slit upon photosensitive material 14 caused to be transported at a predetermined velocity behind the slit. The broken line portion of FIG. 2 illustrates very schematically, without showing specific means for scanning the object or means for folding the optical path from the scanned elements, that by scanning the object and folding the optical path from the scanned elements to the photosensitive material 14, the effective instantaneous half-field angle $b$ ($b'$ in the image space) along the X—X axis which is required at any instant during exposure is a fraction of the total half-field angle ($f_x$) along the same axis.

The broken line portion of FIG. 2 is useful also in illustrating other image-forming characteristics of such a scanning exposure system.

As indicated above, certain aberrations not occurring in static rectilinear exposure systems are inherent in scanning exposure systems as described. One aberration, perhaps more aptly termed a distortion, is a result of the fact that the image distance is maintained substantially constant for all object distances. The broken line ray diagram in FIG. 2 represents the light forming an image of strip AB, as it would appear if reflected at nodal point N along the Z—Z axis and through the focal plane slit 20 into impingement with the photosensitive material 14. From a study of FIG. 2, it may be recognized that the image of strip AB, as it would appear if imaged as shown in the broken line segments of FIG. 2, would form an image A" B" which is not only unfocused, but which is distorted by a lack of scale. The image A" B" lacks the proper scale along both the X'—X' and Y'—Y' axes resulting from a loss in magnification over what would be obtained in a static rectilinear system corrected as indicated above. Thus, $y''$ is less than $y'$ and $x''$ is less than $x'$. This magnification deficiency is due to the effect of an insufficient image distance in relation to the object of strip AB. Consider the effect, for example, on chief ray $R_1$. Recalling that for uniform lateral magnification throughout the field, the tangent of angle $c'$ must equal the tangent of angle $c$, it is seen that whereas in the rectilinear system the ratio of $l'/d'$ (the tangent of angle $c'$) is proportional to $l/d$ (the tangent of angle $c$), the ratio of $l''/d''$ is not proportional to the ratio of $l/d$ and thus the lateral magnification of the image $A''B''$ is not as great as it must be if the image to be produced by the scanning system as described is to have constant lateral magnification throughout the field.

As explained above, the unbroken lines in FIG. 3 represent the image of object 12 that would be formed by an orthoscopic image-forming system. The broken line image 21 represents an image of the object 12 which might result if a scanning exposure system as described were employed to photograph the object 12. The image 21, as described above, would be formed by scanning adjacent elemental strip areas of the object 12 from right to left (with scanning means not shown) concurrently as the photosensitive material 14 is caused to be transported behind the focal plane slit 20 at a velocity effective to maintain the image being formed on the material 14 stationary with respect to the material 14. It is seen from FIG. 3 that the image 21 thus formed exhibits a lack of scale which increases toward the extremes of the field.

Or stated in another way, a cylindrical perspective relationship exists between the object 12 and its image 21. Assuming a planar object, as shown, object areas of equal magnitude subtend, with respect to the nodal point N of the image-forming means 10, successively smaller angles at greater off-axis scan angles. However, because of the varying image magnification, due to the changing ratio of image distance (constant for all scan angles) to object distance (varying with the scan angle) in the illustrated system, the images thus formed of off-axis points will have insufficient scale.

Because of this cylindrical perspective relationship of object and image (cylindrical perspective being defined as the projection of an object upon a cylindrical projection surface having its axis passing through the axial viewpoint, in this instance located at nodal point N), the distortion produced in the images formed resulting from magnification deficiency attributable to an invariant image distance for all object distances is herein termed cylindrical perspective distortion.

It should be understood in connection with the above discussion that the image distance in the described scanning exposure system indicated to be constant is only constant with respect to the scan (X—X) axis, and that along the X—X axis the conditions of a static rectilinear system obtain. A lack of magnification is introduced in the direction parallel to the Y—Y axis which is of a magnitude proportional to the secant of the effective instantaneous scan angle; however, the resulting distortion is simply a scale error caused by the dependence of the Y—Y axis scan coefficient upon the scan angle. The effective instantaneous scan angle is defined in this application as being the scan axis component of the slope angle in object space of the chief ray from an object point being scanned.

In addition to the above described and defined cylindrical perspective distortion, an additional distortion is introduced which is related to the angle which the image plane of the image-forming means 10 makes with the plane of the photosensitive material 14. This angle has been designated $g'$ in the broken line portion of FIG. 2, being the same as the scan angle $g$. As a result of the existence of angle $g'$, the projection $A''B''$ upon the photosensitive material of the deflected image $A'B'$ is shortened in its dimension along the image scan (X'—X') axis by a factor proportional to the secant of the instantaneous scan angle $g$. This distortion is also a result of the effective cylindrical perspective relationship of object and image, and may be thought of as a compressive distortion. This distortion, in order to distinguish from the above-defined cylindrical perspective distortion, is herein termed scan axis compressive distortion. Correction of this compressive distortion is the concern of this invention and is described in detail below.

It is evident from FIG. 2 that:

$$x''/p = l/\sec. g'$$

and $$p/x = l/\sec. g'$$

Therefore $x'/x'' = \sec.^2 g' = \sec.^2 g$

Thus, the total distortion along the X'—X' axis of an image produced by the described scanning exposure system (aside from any true Seidel distortion which may exist in the image-forming means 10) is proportional to the square of the secant of the instantaneous scan angle $g$ and is due to the combined effects of cylindrical perspective distortion and the scan axis compressive distortion. The total distortion in the direction parallel to the Y'—Y' axis is proportional to the first power of the secant of the instantaneous scan angle $g$ and is due solely to the above-described effect of cylindrical perspective distortion.

The correction of scan axis compressive distortion, and a related aberration resulting in a smearing of off-axis image points in a direction transverse to the scan axis, are the subject matter of this invention. A study of FIG. 3 reveals that the hypothetical broken line image $A''B''$ would actually have a slightly trapezoidal configuration, as shown in FIG. 2A which represents a top view of the image $A''B''$. Recall that the image $A''B''$ is reversed (from left to right) by hypothetical deflection means (not shown) positioned at N. Assuming the dimension $y$ of strip AB in the object 12 to be constant along the scan (X—X) axis, a trapezoidal shape of $A''B''$ indicates the presence of a magnification gradient across the focal plane slit 20 in the direction along the X'—X' axis.

This magnification gradient is caused by the above-described relative angular displacement between the focal surface of the images formed by the image-forming means 10 and the plane of the effective image area (represented in FIG. 2 by the photosensitive materials 14). The existence of such a magnification gradient has a two-fold effect upon the formation of images of object points located on either side of the Z—Y plane object space. First, such image points are distorted in a contractive or compressive sense. This effect is herein termed compressive distortion. Second, image points at either side of the Y—Z plane which also lie off the X—X axis are smeared in a direction transverse to the direction of movement of the photosensitive materials (which is also the direction of the image scan axis X'—X'). This effect is hereinafter referred to as transverse smear.

The invention disclosed and claimed in this application is directed to a photographic camera having a scanning exposure system including means for compensating for the described compressive distortions and transverse smearing which would otherwise be present in the images formed by such a system. The above-indicated effects of compressive distortion and transverse smear and the means provided in accordance with this invention to compensate for these effects will be more easily understood after a discussion of the manner and means by which the effects of cylindrical perspective distortion are compensated by the illustrated scanning exposure system. Referring to FIGURE 1, the scanning exposure system may be contained within a very compact camera housing, the broken lines defining the outline of a housing 24 which would be sufficiently large to accommodate the necessary components of a photographic camera embodying such a scanning exposure system.

The illustrated scanning exposure system in its broadest aspect comprises image-forming means, shown by way of example as a simple symmetrical duplet lens 26, scanning means 28 cooperating with the lens 26 for successively scanning adjacent elemental strip areas of an object 29 to be photographed (here shown as a planar object similar to object 12 in FIG. 2), and light reflective means 30 for folding the optical path of the exposure light from the lens 26 to the photosensitive materials 31. A detailed description of the functions of the light reflective means 30 and the means for accomplishing these functions in accordance with this invention will be provided below. A focal plane exposure aperture or slit 32 is located in a plane parallel to and juxtaposed with the plane of the photosensitive materials 31. Transport means 34 are provided for transporting the photosensitive materials 31 behind the slit 32 during an exposure interval.

Although other arrangements are contemplated, in the illustrated embodiment the element farthest forward in the exposure system is the scanning means 28, shown as comprising a planar scanning mirror 38 mounted upon a shaft 40 for rotation about an axis parallel to the Y—Y axis.

Means are provided for causing scanning mirror 38 to oscillate during an exposure interval to scan along the X—X axis from one extreme to the other of the assumed object 29 to be exposed. In the illustrated embodiment such means are shown as taking the form of a motor 44 which may, for example, be electrically or spring powered, which drives a shaft 46 through a set of worm gears 48, 50 upon which is mounted an axial cam 52 operatively engaging a transverse extension 53 on shaft 40. It is evident that by a proper design of the depicted scanning means, the scanning mirror 38 may be caused to periodically scan an object to be photographed through any desired field angle and return again to its initial position, and may be caused to do so at any desired periodic rate.

As discussed above in connection with the background for this invention, with such a scanning exposure system the effective instantaneous field angle along the X—X axis in image space is but a fraction of the total field angle in object space (along the same axis) which may be captured during an exposure interval. Thus, the depicted scanning exposure system may have an exposure chamber whose dimension in the direction corresponding to the X—X axis is very substantially less than the corresponding dimension in the exposure chamber of a conventional hand-held camera employing a static rectilinear system of corresponding focal length and film format size.

Transport means 34 are provided for transporting the photosensitive materials 31 behind the exposure slit 32 during an exposure interval at a velocity which is closely coordinated with the sweep rate of the scanning mirror 38. Careful correlation between the film transport velocity and the scan rate is necessary in order that successively scanned object points are imaged in the correct adjacent relationship on the photosensitive materials 31 to cause the image formed on the photosensitive materials 31 to be substantially stationary with respect thereto. Such transport means may include the motor 44 and a pair of sprockets 56, 58, mounted on shaft 60 for engaging perforations 62 in the photosensitive materials 31 to provide a driving connection between the motor 44 and the photosensitive materials 31.

As more fully explained in the above-identified copending application, the transportation of the photosensitive materials 31 behind the exposure slit 32 effectively acts as a focal plane shutter. The time during which each point on the photosensitive materials 31 is exposed during a total exposure interval accords with the relationship:

$$T = S/V$$

where S=slit width and V=velocity at which the photosensitive materials 31 are transported relative to the exposure slit 32.

It is evident that by a proper selection and correlation of the rotational speed of the motor 44, the gear ratio of the worm gears 48, 50, the relative radii of the sprockets 56, 58 and the shaft 60 upon which they are mounted, and the factors involved in the cam drive by axial cam 52 of the mirror 38, the rate at which the object 29 is scanned by the scanning mirror 38 may be very closely coordinated with the velocity at which the photosensitive materials 31 are transported behind the exposure slit 32.

It is noted that a constant sweep rate of the scanning mirror 38, assuming a constant velocity of the photosensitive materials during exposure, would produce an image that is smeared increasingly toward the extremes of the field. This smearing of the image is a result of the increasing effective sweep rate across the surface of the photosensitive materials 31 at increasing off-axis scan angles. A comprehensive understanding of the sweep velocity characteristic of the scanning mirror 38 which is necessary to produce an image without smear is not essential to the understanding of this invention and, accordingly, an in depth analysis of this problem is not thought to be appropriate here. However, it is noted that the required sweep rate is a function of the square of the cosine of the instantaneous scan angle.

A scanning exposure system constructed in accordance with the teachings of the above-identified copending application may employ a conventional fixed-focus photographic objective as the image-forming means for the system; however, for the reasons set forth above, the images produced will exhibit cylindrical perspective distortion, defined above. Means are provided for altering the magnification of elemental images formed successively during an exposure interval such that cylindrical perspective distortion in the images formed is substantially reduced.

In order that the magnification may be altered as an object is scanned, the optical path length of exposure light in image space, and thus the effective image distance, is caused to be varied in a predetermined program.

It is evident, however, that if such changes in optical path length were effected without providing for corresponding changes in the effective focal distance of the image-forming means the images formed by such a scanning exposure system would exhibit a lack of focus increasing in magnitude toward the extremes of the field (along the X—X axis). Means are also provided, therefore, for changing the effective focal distance of the image-forming means during a scan of an object in coordination with the said changes in optical path length of the exposure light.

FIGURE 1 schematically illustrates structure which may be used to conjointly accomplish the afore-described changes in the optical path length and effective focal distance. The lens 26, in combination with the aperture stop, is preferably orthoscopic, acting to produce an image which is substantially free of Seidel distortion. Stated in another way, the effective focal distance of the lens 26 for any given object point is a function of the secant of the slope angle of the object chief ray from that point.

In the FIGURE 1 embodiment, the lens 26 is illustrated schematically as a simple symmetrical duplet lens comprising a pair of meniscus elements 66 and 68 supported in a lens holder 70. A between-the-lens aperture stop 72 is shown disposed centrally between elements 66 and 68. A simple, two-element lens has been depicted for the sake of clarity in describing the invention. It should be understood however, that in practice a more highly corrected lens may be preferred. The lens 26 forms images at an image area, defined herein as being that area at which it is desired to record the images, which may or may not coincide with or contain the focal surface in which the best image is formed.

In order to change the optical path length of the exposure light in image space, and thus the image distance, to accomplish the desired magnification changes, the lens 26 is moved along the axis O—O during exposure. Simultaneously therewith, the lens 26 is pivoted about an axis (labeled L—L in FIGURE 1) parallel to the slit 32, causing the effective slope angle (with respect to the geometrical axis M—M of lens 26) of chief rays from successively scanned object points to vary, with resulting corresponding variations in the effective focal distance of the lens 26.

Structure for effecting such simultaneous translatory and rotary movement of lens 26 may include a shaft 74 affixed to lens 26 for rotatably mounting lens 26. The ends of shaft 74 are supported in slots 76, 78 in a pair of end plates 80, 82, respectively. A pair of radial arms 84, 86 affixed to shaft 74 carry pins 88, 90 extending into arcuate slots 92, 94 in end plates 80, 82, respectively.

Lens driving means are provided for causing the pins 88, 90 to periodically traverse the slots 92, 94 to cause the lens 26 to be simultaneously rotated about axis L—L and translated along the optical axis O—O. Such lens driving means are illustrated as comprising a shaft 96 journaled in the end plates 80, 82 upon which is mounted a pair of radial drive members 98, 100, having slots 102, 104 which receive pins 88, 90, respectively.

The shaft 96 may be driven with the requisite oscillatory motion by means of a cam 106 on cam shaft 46 operatively engaging a transverse extension 108 on shaft 96. By a proper design of the camming surface on cam 106, the configuration of the arcuate slots 92, 94, and the other relevant mechanical parameters, the lens 26 may be translated along axis O—O and rotated about axis L—L during exposure in accordance with any desired program and in intimate coordination with the scan of the object 41 effected by scanning means 28.

The manner in which the above-described cylindrical perspective distortion is compensated may be most easily understood in connection with a description of the operation of the elements of the exposure system thus far described. For purposes of this explanation, it should be assumed that the light reflective means 30, described in detail hereinafter, is maintained fixed at 45° with respect to axis O—O during exposure, as shown in unbroken lines in FIGURE 1. It should be noted that in order to prevent a premature exposure of the photosensitive materials 31, either a capping shutter may be employed, or alternatively, the leading edge of the area of the photosensitive materials 31 to be exposed may be maintained sufficiently offset from the slit 32 to preclude exposure by stray light. Prior to the initiation of an exposure interval, the angular attitude of cams 52 and 106 are preset such that the scanning mirror 38 is oriented to scan the object from right to left (in FIGURE 1) and the pins 88 and 90 are located at corresponding extremes of the arcuate slots 102 and 104, respectively. With the pins 88, 90 positioned thus, the lens-to-film distance is at a maximum, producing the greatest image magnification, and the angular separation, defined by angle $u$, between the geometrical axis M—M and the optical axis O—O is also at a maximum, the lens 26 thereby having the greatest effective focal distance.

The operation of the exposure system, as thus far described, is as follows. An exposure interval is initiated by the energization of drive motor 44, causing the photosensitive materials 31 to be driven at a predetermined velocity behind the exposure slit 32. Through worm gears 48, 50 driving axial cam 52, the scanning mirror 38 is caused to sweep across the object to be photographed at a sweep velocity coordinated with the rate at which the photosensitive materials 31 are transported behind the slit 32. The manner in which the image magnification and the effective focal length of the lens is varied during an exposure interval may be more clearly understood by reference to FIGS. 4a–4e which represent a time sequence of ray diagrams during an exposure interval. FIGS. 4a–4e depict the manner in which the magnification of strip images of successively scanned object strips is varied during an exposure interval to produce a total image all parts of which are substantially in focus and substantially free from cylindrical perspective distortion.

As evidenced by FIGURES 1 and 4a–4e, during the first half of an exposure interval as one half of the total field, designated by the half-field angle $f_x$, is scanned, the optical path length in image space of the light from successively scanned object areas, and hence the instantaneous effective image distance, is decreased from a maximum to a minimum with a characteristic according with the secant of the effective instantaneous scan angle. Accordingly, the magnification decreases from a maximum to a minimum value with a similar characteristic. Simultaneously therewith, the lens 26 is rotated about axis L—L to effect a decrease in its effective focal distance in a characteristic which is also related to the secant of the effective instantaneous scan angle.

Similarly, on the opposed side of the Z—Z axis, changes in the effective focal length of lens 26 and in the image magnification are effected, but with an increasing, rather than decreasing, magnitude. The changes in magnification and effective focal length are coordinated in a predetermined program, as described, such that during an exposure interval the images produced are substantially in focus and substantially free from cylindrical perspective distortion.

The program or characteristic by which the magnification and effective focal distance are varied during a scan of the object in accordance with the invention has been related in the above explanation to the magnitude of the effective instantaneous scan angle. As started above, the effective instantaneous scan angle is defined herein as being equal to the scan sxis (X—X) component of the slope angle (with respect to the Z—Z axis) of the chief ray in object space from the object point being scanned. It follows then, that the explanatory matter above may be though of in terms of chief rays from scanned object points and associated slope angle components, rather than in terms of scan angles.

Means have been described for substantially reducing the cylindrical perspective distortion which would otherwise appear in the images formed by the described scanning exposure system. However, as discussed briefly above, the images produced by the system thus described would have compressive distortions resulting from the relative angular displacement of the focal surface and the phtosensitive material on which the images are formed; in addition, the images of certain off-axis object points would be smeared in a direction transverse to the image scan axis X'—X'.

Figure 5:
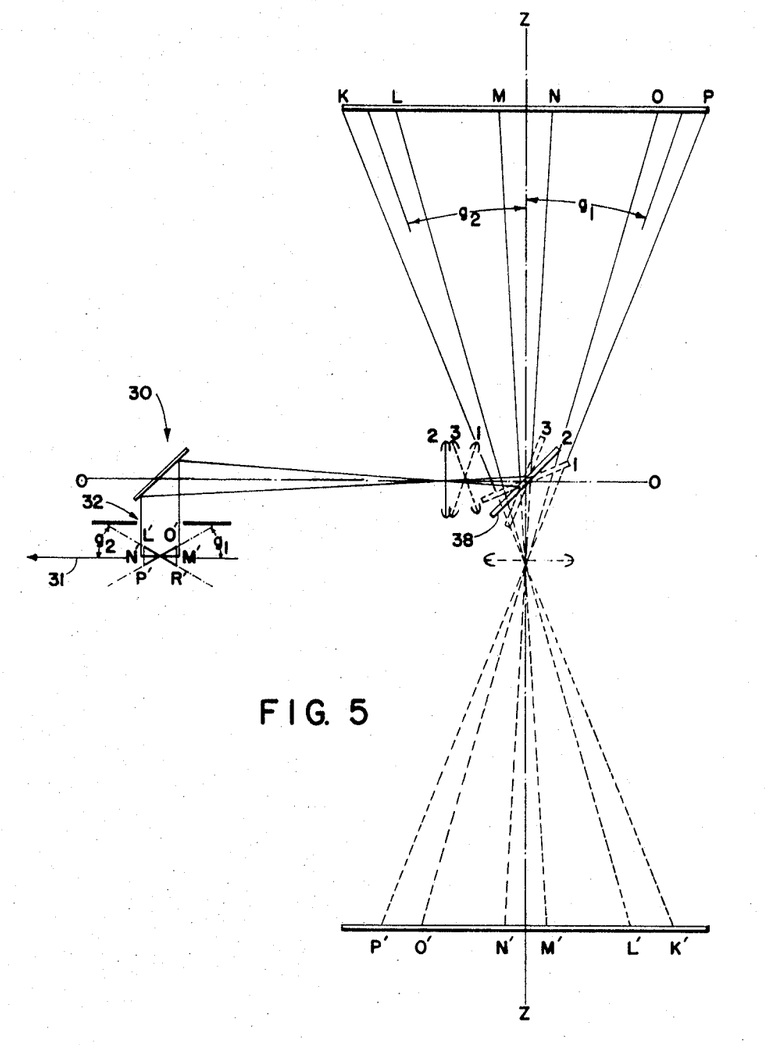
FIG. 5 is a schematic representation of an uncompensated scanning exposure system depicting the manner in which the focal surface of successively formed elemental images varies relative to a fixed planar image area during a scan by the system of an object being photographed.

FIG. 5 schematically illustrates the scanning exposure system of FIGURE 1 with the light reflective means 30 fixed at 45° with respect to the O—O axis. It is seen that as the scanning mirror 38 rotates through the positions numbered 1–3 to scan the hypothetical planar object KP the focal plane varies with respect to the plane through which the photosensitive materials 31 are moved during exposure. For example, when the effective instantaneous scan angle is $g$, during a scan of the object KP, the focal plane of the image O'P' of object component OP makes an angle $g'$, with the plane of the photosensitive materials 31, angle $g'$, being equal to angle $g$. The ray traces from object components LL and OP beyond the scanning mirror 38 have been eliminated to simplify the figure. It will be understood from FIG. 5 that the magnitude of the compressive distortion which is produced is inversely related to the cosine of the effective instantaneous scan angle, or, stated in another way, is directly proportional to the secant of the effective instantaneous scan angle.

The transverse smearing of image points, as indicated above, is due to the presence of a magnification gradient across the focal plane slit (32 in FIGURE 1). Because of this magnification gradient, the images formed through slit 32 exhibit non-uniform magnification, as indicated in FIGS. 4a–4e by the trapezoidal shape of the images of the rectangular object strips AB, CD, EF, GH and IJ. It is noted that the light reflective means, shown schematically in FIG. 4 at 30, effects a side-to-side reversal of the strip images A'B', C'D', E'F', G'H' and I'J'.

The effects of the described compressive distortion and transverse smear on the images formed are shown in FIG. 3. As indicated above, the broken line image 21 represents an image of object 29 which might be formed by the described scanning exposure system without any compensation for cylindrical perspective distortion, compressive distortion, or transverse smear. The dot-dash image 112 represents an image of object 29 which might be formed by the described scanning exposure system compensated only for cylindrical perspective distortion, as described above. It can be seen that the compensation for cylindrical perspective distortion has substantially eliminated the magnification deficiency otherwise produced in the direction parallel to the Y'—Y' axis. It will be further noted that a substantial amount of the compression in the direction parallel to the X'—X' axis is also eliminated by the described compensation for cylindrical perspective distortion.

However, the described effects of compressive distortion along the X'—X' axis and the effects of transverse smear remain. The effects of compressive distortion are evidenced by the X'—X' dimension of strip I"J" at the extreme of the field with the X'—X' dimension of strip G"H" nearer the center of the field and that of strip E'F' at the center of the field. The magnitude of the compressive distortion is a direct function of the image scan axis component of the slope angle of the chief ray in object space from the point being scanned. Or, stated in another way, the magnitude of the compressive distortion is inversely related to the magnitude of the scan axis component of the object plane inclination angle of the chief ray from the object point being scanned, as described in detail below.

Transverse smear is evidenced by a smearing of image points in the quadrants defined by the X'—X' and Y'—Y' axes in a direction transverse to the image scan axis X'—X'. The effect is most noticeable in the smearing of lines or edges which lie parallel to the scan axis X—X. By way of example, the smearing of the horizontal lines defining the top and bottom of object 29 has been portrayed (exaggerated) in FIG. 3 by the tapered areas 114.

The case of transverse smear may be best understood by envisioning the experience of a single image point as it is formed on photosensitive material 31 during exposure behind slit 32. Consider, for example, the effect on the formation of the image of object point 116 in the upper right-hand corner of object 29. Without compensation for cylindrical perspective distortion, the image of object point would be formed at 116'. Compensated for cylindrical perspective distortion only, the image of point 116 would be formed first at 116" as the point on photosensitive material 31 upon which the light forming image point 116" first impinges emerges from beneath the trailing edge of slit 32. As indicated above (see FIGS. 4a–4e), there exists a magnification gradient across the slit 32. The gradient is oriented such that the magnification increases in the direction of transport of the photosensitive materials 31. Thus, the effect on image point 116" would be such that the image point 116", as it traverses the slit 32, is smeared in a direction transverse to the image scan axis X'—X', as shown by the direction arrow 118. As illustrated by the taper of the areas 114, the magnitude of the smearing produced is inversely related to the magnitude of the scan axis component of the object plane inclination angle herein defined as that angle which a chief ray in object space makes with the object plane.

This invention is directed to the correction of the described compressive distortion and transverse smear. In accordance with this invention, the correction is achieved by causing the effective scan axis component of the image area inclination angle, herein defined as that angle which a chief ray in image space makes with the plane in which images are to be recorded, of image chief rays to substantially correspond to the scan axis component of the object plane inclination angle of corresponding object chief rays. Means for accomplishing the correspondence of the object plane inclination angles and image area inclination angles are shown structurally in FIGURE 1 and schematically in FIG. 6. In accordance with this invention, the light reflective means 30 may comprise a mirror 120 mounted so as to be capable of a movement with both a translational and a rotational component. As described in detail below, the mirror 120 is caused to be moved during a scan of the object in close coordination with the scanning mirror 38 and the transport means 34 in such a way as to maintain the focal plane of lens 26 in angular coincidence with the predetermined image area through which the photosensitive materials 31 are moved during exposure.

Figure 6:
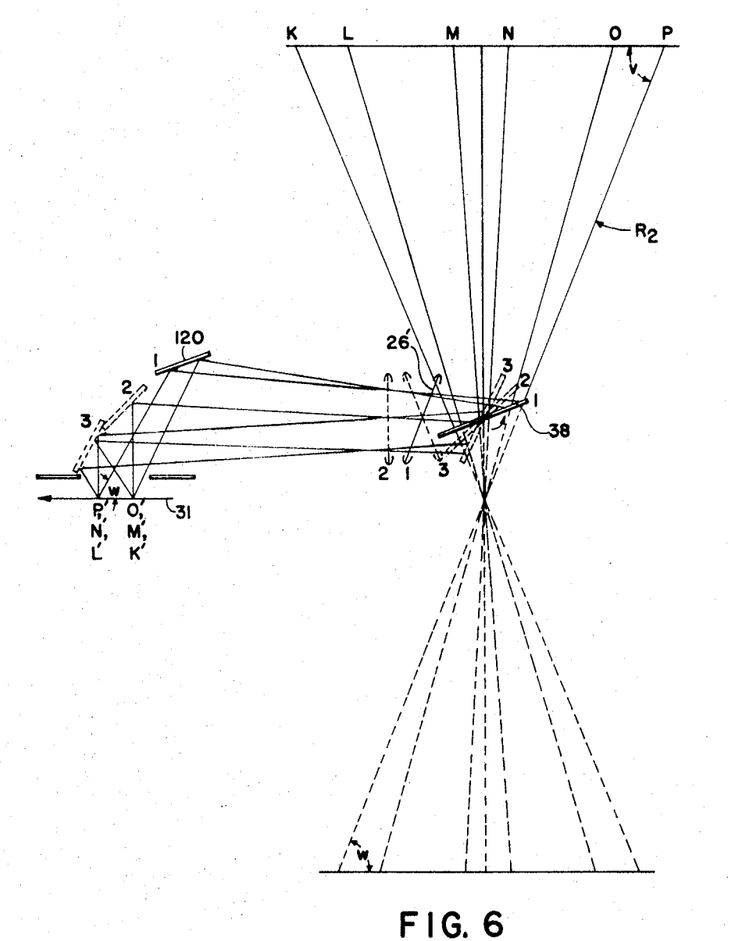
FIG. 6 is a schematic representation of a scanning exposure system similar to the system depicted in FIG. 5 but employing the principles of the invention to rectify the described compressive image distortions.

FIG. 6 diagrammatically depicts a compound rotational and translational movement of the mirror 120 which will achieve the objects of this invention. The mirror 120 is initially positioned parallel to the scanning mirror 38. As the scanning mirror 38 is rotated through positions 1–3 to scan the object KP, the mirror 120 is rotated at the same angular rate as scanning mirror 38 so as to stay at all times parallel therewith. It is well known that a light ray reflected sequentially from two high-reflective surfaces is deflected from its original direction through an angle equal to twice the dihedral angle between the reflective surfaces. Thus, by preserving a parallel relationship of the mirrors 38 and 120 during a scan of the object, the scan axis component of the image area inclination angle is at all times during a scan of the object substantially equal to the scan axis component of the object plane inclination angle. For example, when scanning mirror 38 is positioned in numbered position 1 in FIG. 6, intercepted chief ray $R_2$, having a scan axis component $v$ of its object plane inclination angle, is reflected in sequence from mirrors 38 and 120 and then impinges on photosensitive materials 31 at an inclination angle whose scan axis component $w$ is equal to angle $v$. It is evident from the broken projection lines in FIG. 6 that the angle $w$ is, by this invention, caused to be equal to the corresponding angle $w$, that would exist in a static rectilinear image-forming system.

It is noted that the lens 26' is caused to move during a scan of the object in a program represented by the numbered sequence of positions to accomplish the above-described changes in effective focal length.

The effect of varying the image area inclination angle, and thus the angular attitude of the focal surface with respect to the image area during a scan of the object, as described, is to produce a uniform lateral magnification throughout the field. That is to say, the above-described magnification gradient which would otherwise exist across the slit 32 is eliminated, and thus rectangular object configurations will be imaged at the proper scale and undistorted by compressive distortion. Also, the elimination of the magnification gradient across the slit 32 eliminates the described problem of transverse smearing of image points as they traverse the slit 32 during exposure.

FIGURE 1 illustrates a structural embodiment by which the mirror 120 may be moved in accordance with the teachings of the invention. The mirror 120 is mounted at its ends in holders 122, 124. Holder 122 has forward and rear transverse extensions 126, 128, respectively. Holder 124 has forward and rear transverse extensions 130 and 132, respectively. A pair of end plates 134, 136 are provided for supporting the mirror 120. The end plates 134, 136 have forwardly disposed slots 138, 140, respectively, for receiving the forward extensions 126, 130 on holders 122, 124. The end plates 134, 136 have rearwardly disposed slots 142, 144, respectively, for receiving the rear extensions 128, 132 on holders 122, 124. The slots 138, 140, 142 and 144 are precisely configured to effect the compound rotational and translational movement of the mirror taught by the invention, as described above and as shown, by way of example, in FIG. 6.

To drive the mirror 120 through the locus of travel predetermined by the configuration and location of the slots 138, 140, 142 and 144, a radial cam 146 is provided. The cam 146 may be driven, as shown, by motor 44 through a set of worm gears 148, 150 appropriately designed to drive the mirror 120 in close coordination with the scanning mirror 38 and the transport means 34.

In operation, as the object is scanned during exposure (from right to left in FIGURE 1) by the scanning mirror 38, the cam 146 drives the mirror 120 through the numbered position sequence to effect the described variations in the image area inclination angle.

Figure 7:
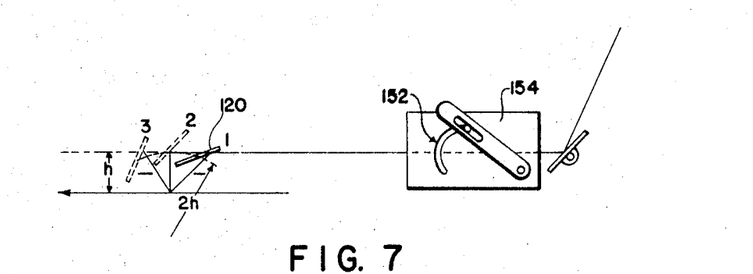
FIG. 7 depicts schematically an alternative embodiment of the invention.

FIG. 7 schematically depicts an alternative embodiment of the inventive concepts which may be employed to minimize the travel of the mirror 120 during exposure. As shown, the mirror 120' may be given a compound movement during exposure wherein the mirror simultaneously is rotated about a central pivot axis while the pivot axis is moved through an arc having a radius approximately equal to twice the displacement $h$ (in position 2) of the pivot axis from the photosensitive mate-rail 31. Such a compound movement may be achieved by swinging the mirror about a point at the center of the radius $2h$.

It is noted that the FIGS. 1 and 6 embodiments depicts a locus of the travel of the mirror 120 which preserves the described path length changes utilized to compensate for cylindrical perspective distortion. The FIG. 7 embodiment, however, depicts a mirror travel which does not preserve the necessary path length changes for compensation for cylindrical perspective distortion. Accordingly, in FIG. 7 the shape of the slots 152 in the end plates 154 is altered. With an asymmetrical slot shape, as shown, the magnification which would otherwise be lost (if the slots were symmetrical as shown at 92 and 94) in the first half of the exposure interval and exaggerated in the second half of the exposure interval is corrected in order that proper compensation for cylindrical perspective distortion is also achieved.

Figure 8:
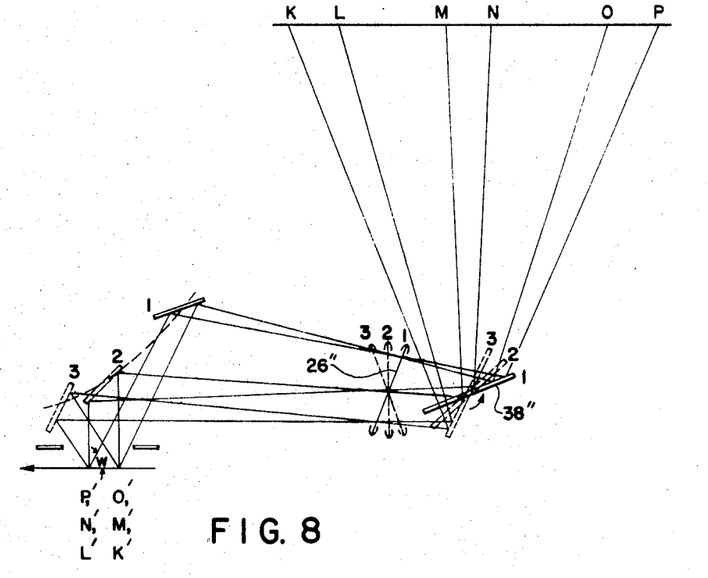
FIG. 8 is a schematic representation of still another embodiment of the inventive concepts.

Yet another possible implementation of the inventive concepts is shown schematically in FIG. 8. Recall that in each of the embodiments described above, the magnification changes required during exposure to compensate for cylindrical perspective distortion are depicted as being accomplished by movement of the lens in a predetermined program along the optical axis. The compensation for compressive distortion and transverse smear has been depicted as being accomplished by movement of a separate element of the exposure system, namely the mirror 120 (or 120' in FIG. 7).

The FIG. 8 embodiment illustrates means that might be employed to simultaneously compensate for cylindrical perspective distortion as well as for compressive distortion and transverse smear in the images formed by the system. To this end, the mirror 120", corresponding to mirror 120 in FIGURE 1 and mirror 120' in FIG. 7, in order to alter the magnification to compensate for cylindrical perspective distortion, is moved along a locus of travel which is effective to shorten the optical path length of exposure light in image space during the first half of the exposure interval as the scene is being scanned through one half the effective field of the exposure system, and then to lengthen the effective optical path length as the remaining one-half of the effective field is scanned, as suggested by the above description of cylindrical perspective distortion and the manner in which it may be compensated. The mirror 120" is simultaneously caused to be rotated to effect the changes in the image area inclination angle in accordance with the described inventive concepts. It is noted that in this embodiment the lens (shown schematically at 26") need only be rotated about a stationary pivot axis to accomplish the necessary changes in effective focal length, also as described above.

Certain other variations in the above apparatus may be made without departing from the scope of the invention herein involved. For example, the invention may be implemented by other structures effective to vary the angular attitude of the focal plane with respect to the image area during a scan of the scene in accordance with the teachings of this invention. It is therefore intended that all matter contained in the above description or shown in the accompanying drawings shall be interpreted as illustrative and not in a limiting sense.

What is claimed is:

1. A compact photographic camera for exposing photosensitive materials comprising, in combination:

image-forming means on an optical axis for forming real images of a photographic object at a predetermined image area;

scanning means disposed on said optical axis for cooperation with said image-forming means to effect a continuous angular optical scan of the object along a scan axis such that successively scanned object points are imaged in succession at said image area, the angular attitude of the focal surface of successively formed image points varying with respect to said image area during a scan of the object to cause compressive distortions of said image points which bears an inverse relationship to the magnitude of the scan axis component of the object plane inclination angle of the chief ray from an object point being scanned;

means for effecting relative movement between said image area and the photosensitive materials at a predetermined velocity coordinated with the scan of said scanning means such that adjacent object points scanned successively are imaged in succession upon said photosensitive materials during said relative movement, whereby an image of the object may be recorded upon the photosensitive materials; and compensation means coordinated with said scanning means and said movement-effecting means during a scan of the object for reducing the said compressive distortions of the images thus formed.

2. A compact photographic camera for exposing photosensitive materials comprising, in combination:

image-forming means on an optical axis for forming real images of a photographic object at a predetermined image area;

scanning means disposed on said optical axis for cooperation with said image-forming means to effect a continuous angular optical scan of the object along a scan axis such that successively scanned object points are imaged in succession at said image area, the angular attitude of the focal surface of successively formed image points varying with respect to said image area during a scan of the object to cause compressive distortions of said image points which bears an inverse relationship to the magnitude of the scan axis component of the object plane inclination angle of the chief ray from an object point being scanned;

means for effecting relative movement between said image area and the photosensitive materials at a predetermined velocity coordinated with the scan of said scanning means such that adjacent object points scanned successively are imaged in succession upon said photosensitive materials during said relative movement, whereby an image of the object may be recorded upon the photosensitive materials; and compensation means coordinated with said scanning means and said movement-effecting means during a scan of the object for causing the effective scan axis components of the respective image area inclination angles of image chief rays to vary to substantially correspond to the said scan axis components of said object plane inclination angles of the corresponding object chief rays in object space.

3. A compact photographic camera for exposing photosensitive materials comprising, in combination:

image-forming means on an optical axis for forming real images of a photographic object at a predetermined image area;

scanning means disposed on said optical axis for cooperation with said image-forming means to effect a continuous angular optical scan of the object along a scan axis such that successively scanned object points are imaged in succession at said image area, the angular attitude of the focal surface of successively formed image points varying with respect to said image area during a scan of the object to cause compressive distortions of said image points which bears an inverse relationship to the magnitude of the scan axis component of the object plane inclination angle of the chief ray from an object point being scanned;

means for effecting relative movement between said image area and the photosensitive materials at a predetermined velocity coordinated with the scan of said scanning means such that adjacent object points scanned successively are imaged in succession upon said photosensitive materials during said relative movement, whereby an image of the object may be recorded upon the photosensitive material;

light reflective means in image space for deflecting said optical axis; and compensation means coordinated with said scanning means and said movement-effecting means during a scan of the object for causing the effective scan axis components of the respective image area inclination angles of image chief rays to vary to substantially correspond to the said scan axis components of said object plane inclination angles of the corresponding object chief rays in object space.

4. The apparatus defined by claim 3 wherein said compensation means includes means for imparting angular movement to said light reflective means during a scan of the object to cause said variations in said scan axis component of said image area inclination angle of chief rays in image space.

5. A compact photographic camera for exposing photosensitive materials comprising, in combination:

image-forming means on an optical axis for forming real images of a photographic object at a predetermined image area;

means defining an elongated focal plane aperture at said image area;

scanning means disposed on said optical axis for cooperation with said image-forming means to effect a continuous angular optical scan of the object along a scan axis such that successively scanned object points are imaged in succession at said image area, the angular attitude of the focal surface of successively formed image points varying with respect to said image area during a scan of the object to cause compressive distortions of said image points which bears an inverse relationship to the magnitude of the scan axis component of the object plane inclination angle of the chief ray from an object point being scanned;

transport means for transporting photosensitive materials behind said aperture and through said image area at a predetermined velocity coordinated with the scan rate of said scanning means such that adjacent object points scanned successively are imaged in succession upon said photosensitive material during transportation thereof behind said aperture, whereby an image of the object may be recorded upon the photosensitive materials; and compensation means coordinated with said scanning means and said movement-effecting means during a scan of the object for causing the effective scan axis components of the respective image area inclination angles of image chief rays to vary to substantially correspond to the said scan axis components of said object plane inclination angles of the corresponding object chief rays in object space.

6. A compact photographic camera for exposing photosensitive materials comprising, in combination:

image-forming means on an optical axis for forming real images of a photographic object at a predetermined image area;

means defining an elongated focal plane aperture at said image area;

scanning means disposed on said optical axis for cooperation with said image-forming means to effect a continuous angular optical scan of the object along a scan axis such that successively scanned object points are imaged in succession at said image area, the angular attitude of the focal surface of successively formed image points varying with respect to said image area during a scan of the object to cause compressive distortions of said image points which bears an inverse relationship to the magnitude of the scan axis component of the object plane inclination angle of the chief ray from an object point being scanned;

light reflective means in image space near said aperture for deflecting said optical axis through said aperture;

transport means for transporting photosensitive materials behind said aperture and through said image area at a predetermined velocity coordinated with the scan rate of said scanning means such that adjacent object points scanned successively are imaged in succession upon said photosensitive material during transportation thereof behind said aperture, whereby an image of the object may be recorded upon the photosensitive materials; and compensation means coordinated with said scanning means and said transport means during a scan of the object for causing the effective scan axis components of the respective image area inclination angles of image chief rays to vary to substantially correspond to the said scan axis components of said object plane inclination angles of the corresponding object chief rays in object space.

7. The apparatus defined by claim 6 wherein said compensation means includes means for imparting movement during a scan of the object to said light reflective means, which movement has a rotational component and a translational component effective to cause said variations in said scan axis component of said image area inclination angle of chief rays in image space.

8. A compact photographic camera for exposing photosensitive materials comprising, in combination:

image-forming means on an optical axis for forming real images of a photographic object at a predetermined image area;

scanning means disposed on said optical axis for cooperation with said image-forming means to effect a continuous angular optical scan of the object along a scan axis such that successively scanned object points are imaged in succession at said image area, the angular attitude of the focal surface of successively formed image points varying with respect to said image area during a scan of the object to cause compressive distortions of said image points which bears an inverse relationship to the magnitude of the scan axis component of the object plane inclination angle of the chief ray from an object point being scanned;

means for effecting relative movement between said image area and the photosensitive materials at a predetermined velocity coordinated with the scan of said scanning means such that adjacent object points scanned successively are imaged in succession upon said photosensitive materials during said relative movement, whereby an image of the object may be recorded upon the photosensitive materials;

first compensation means coordinated with said scanning means and said transport means for causing the magnification to vary during a scan of the object in a direct relationship to the magnitude of the scan axis component of the slope angle in object space of the chief ray from an object point being scanned to substantially reduce cylindrical perspective distortion in the images formed by said image-forming means; and second compensation means coordinated with said scanning means and said movement-effecting means during a scan of the object for causing the effective scan axis components of the respective image area inclination angles of image chief rays to vary to substantially correspond to the said scan axis components of said object plane inclination angles of the corresponding object chief rays in object space.

9. A compact photographic camera for exposing photosensitive materials comprising, in combination:

image-forming means on an optical axis for forming real images of a photographic object at a predetermined image area;

means defining an elongated focal plane aperture at said image area;

scanning means disposed on said optical axis for cooperation with said image-forming means to effect a continuous angular optical scan of the object along a scan axis such that successively scanned object points are imaged in succession at said image area, the angular attitude of the focal surface of successively formed image points varying with respect to said image area during a scan of the object to cause compressive distortions of said image points which bears an inverse relationship to the magnitude of the scan axis component of the object plane inclination angle of the chief ray from an object point being scanned;

light reflective means in image space near said aperture for deflecting said optical axis through said aperture;

means for effecting relative movement between said image area and the photosensitive materials at a predetermined velocity coordinated with the scan of said scanning means such that adjacent object points scanned successively are imaged in succession upon said photosensitive materials during said relative movement, whereby an image of the object may be recorded upon the photosensitive materials;

first compensation means coordinated with said scanning means and said transport means for causing the magnification to vary during a scan of the object in a direct relationship to the magnitude of the scan axis component of the slope angle in object space of the chief ray from an object point being scanned to substantially reduce cylindrical perspective distortion in the images formed by said image-forming means; and second compensation means coordinated with said scanning means and said movement-effecting means during a scan of the object for causing the effective scan axis components of the respective image area inclination angles of image chief rays to vary to substantially correspond to the said scan axis components of said object plane inclination angles of the corresponding object chief rays in object space.

10. The apparatus defined by claim 9 wherein said first and second compensation means include means for imparting movement during a scan of the object to said light reflective means, which movement has a rotational component and a translational component effective to alter the optical path length of exposure light in image space to cause said variations in magnification and simultaneously therewith to cause the said variations in the effective scan axis components of the said image area inclination angles of image chief rays.

References Cited

UNITED STATES PATENTS

| | | | |
|---|---|---|---|
| 1,136,761 | 4/1915 | Becker | 95—15 |
| 1,950,166 | 3/1934 | Durholz | 95—45 |
| 2,682,194 | 6/1954 | Rosenburgh | 88—24 |
| 2,966,096 | 12/1960 | D'Incerti et al. | 95—15 |
| 3,030,861 | 4/1962 | Mortimer et al. | 350—187 |
| 3,057,259 | 10/1962 | Schuma | 350—187 |

JOHN M. HORAN, Primary Examiner

DAVID B. WEBSTER, Assistant Examiner

U.S. Cl. X.R.

95—12.5, 45; 355—52